UNITED STATES PATENT OFFICE.

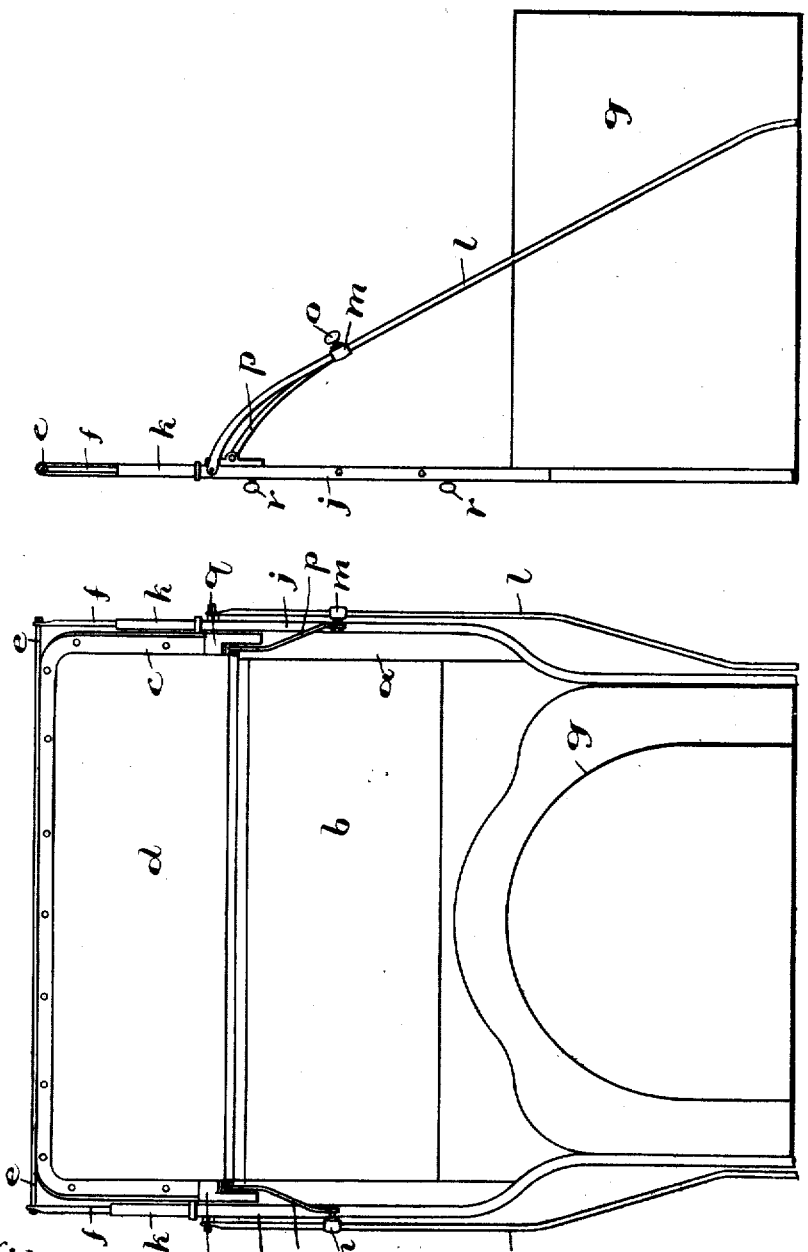

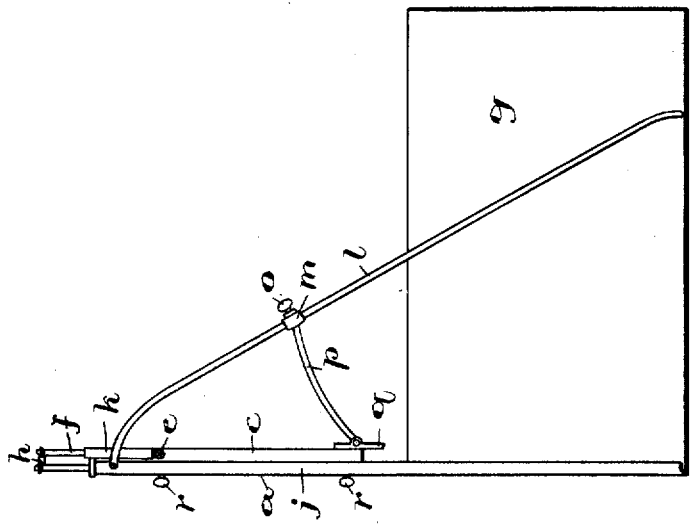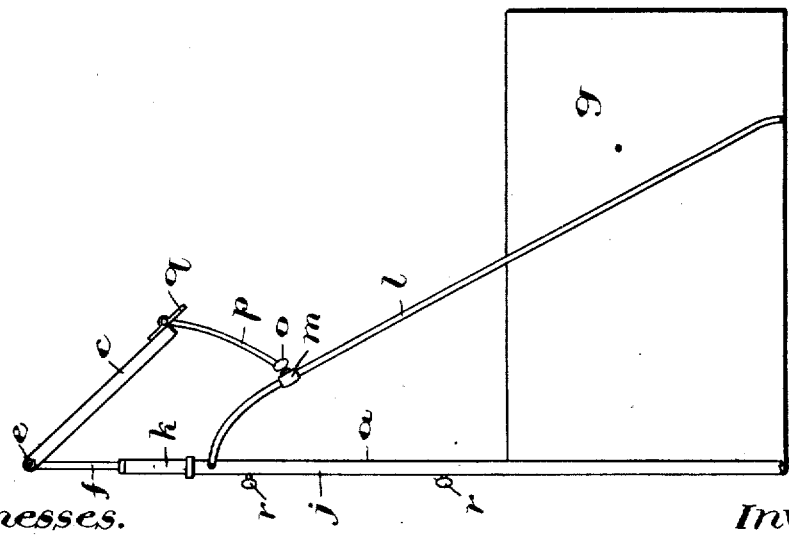

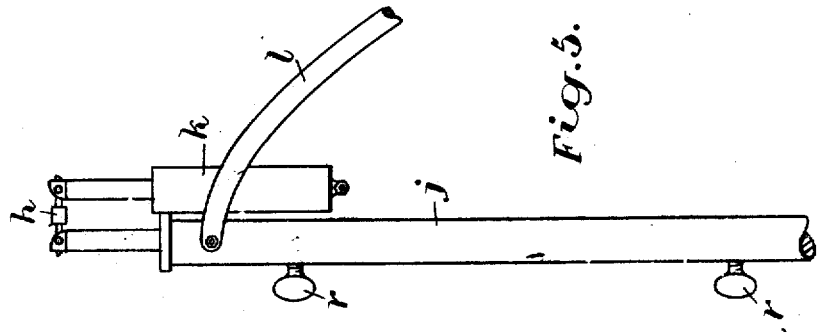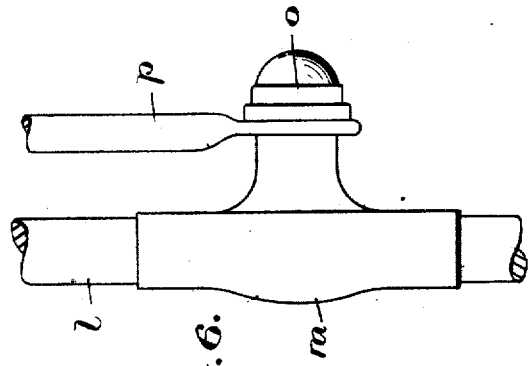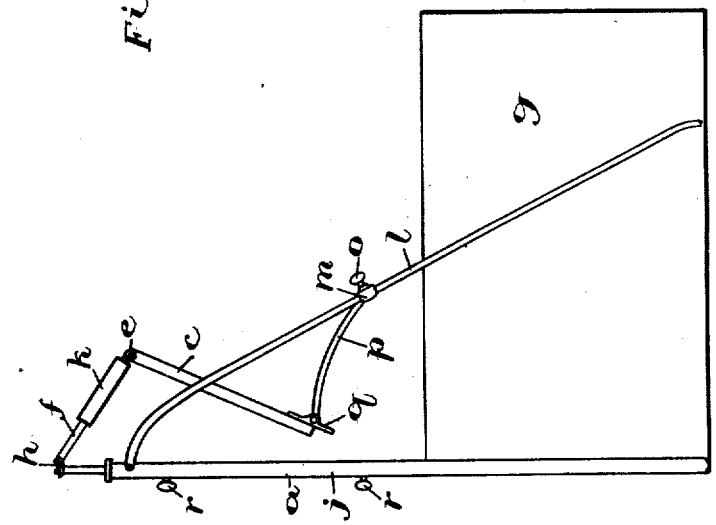

ALBERT E. GOODERHAM, OF TORONTO, ONTARIO, CANADA.

AUTOMOBILE-FRONT.

1,024,567.  Specification of Letters Patent.  Patented Apr. 30, 1912.

Application filed August 13, 1907. Serial No. 388,298.

*To all whom it may concern:*

Be it known that I, ALBERT EDWARD GOODERHAM, of the city of Toronto, in the county of York and Province of Ontario, Canada, have invented certain new and useful Improvements in Automobile-Fronts; and I hereby declare that the following is a full, clear, and exact description of the same.

It has been ascertained in the field of actual experience that the transparency of an automobile front is affected to a greater or less extent by rain and dust, and that the reduction of the transparency impairs the vision of the occupants, and thus increases the difficulty and hazard of driving the automobile.

The present invention relates to an automobile front, designed to protect the occupants of the automobile, from the weather, and capable of being adjusted to provide them with an unobstructed line of vision under all conditions of weather and use; and it may be described as comprising a lower section having its top edge below the line of vision, and an upper section, adjustable relatively to the lower section, and extending from the top edge of the latter to the top of the automobile front and arranged to be selectively positioned by an adjustable supporting means connected to the automobile, as hereinafter set forth and particularly pointed out in the appended claims.

For a full understanding of the invention, reference is to be had to the following description and to the accompanying drawings, in which—

Figure 1 is a front elevation of the automobile front with the upper section thereof in the same vertical plane as the lower section. Fig. 2 is a side elevation of the automobile front showing the same parts in the same position as in Fig. 1. Fig. 3 is a side elevation of the automobile front with the upper section positioned to protect the occupants of the automobile from the weather, and to provide them with an unobstructed line of vision. Fig. 4 is a side elevation of the automobile front showing the upper section lowered and locked against the outer surface of the lower section. Fig. 4ª is a side elevation of the automobile front showing the course of the upper section as it moves from its position in Fig. 3, to its position in Fig. 4. Fig. 5, is a view of the supporting frame by which the upper section of the automobile front is adjusted to the lower section, and Fig. 6, is a detail of a portion of the supporting frame, and the slidable sleeve employed to brace the several members of the supporting frame shown in Fig. 5.

Like characters of reference refer to like parts throughout the specification and drawings.

The automobile front has been shown in the drawings as attached to an automobile, but it may be built either as, an integral, or a separate part of the automobile, and th following description will therefore be confined, as far as possible to the automobile front itself without regard to the means of attachment to the automobile.

The automobile front consists of a lower sash $a$, glazed with a transparent pane $b$, extending to the top edge thereof and an upper sash $c$, glazed with a pane $d$, extending from the top edge of the lower sash $a$ to the top of the automobile front. The top edge of the lower sash $a$, when the automobile front is fitted to the automobile, is located below the line of vision of the occupants, and the upper sash $c$ extends above the line of vision and is provided at or near its upper edge with trunnions $e$, revolubly mounted in the upper sections $f$, of the side bars of the supporting frame, so that it can be moved into the same vertical plane as the lower sash $a$, when it is desired to maintain the parts of the automobile front in the position shown in Fig. 2, or moved into a plane at an inclination thereto, when it is desired to maintain them in the position shown in Fig. 3.

When the upper sash $c$, is moved into the inclined position shown in Fig. 3, an opening is presented between the top edge of the lower sash $a$, and the bottom edge of the upper sash $c$, to provide an unobstructed line of vision for the occupants. In cold weather the upper sash $c$, may, if desired, be moved into the same vertical plane as the lower sash $a$, as shown in Fig. 2, and in wet weather, and when traveling over dusty roads the upper sash $c$, can be opened into the inclined position shown in Fig. 3, i. e. projecting outwardly from the automobile front toward the front of the engine hood $g$.

The inclination of the upper sash $c$, is regulated to the direction of the falling rain, so that the latter will be prevented from entering the opening between the upper and lower sashes presented for the line of vision, that is, if the rain is falling in a nearly vertical position, the upper sash can be opened to its maximum extent, but if the rain is driven by the wind and approximately in a horizontal direction, the upper sash must necessarily be positioned so as to present a minimum opening between itself and the lower sash, as otherwise the rain could enter the automobile, to the discomfort of the occupants. By this means the presence of the rain or dust on the panes of the upper and lower sashes need not obstruct the view of the occupants of the automobile.

The upper sections $f$ of the supporting frame are connected by double jointed hinge members $h$, to the lower sections $j$, and the lower sections $j$ are connected to some convenient part of the automobile structure. Slidable on the supporting frame, are bracing sleeves $k$, arranged, when the parts of the supporting frame are in the position shown in Figs. 1, 2 and 3, to inclose the hinge members $h$, and engage the upper parts of the lower sections $j$ and the lower parts of the upper sections $f$ to rigidly hold them alined, so that the supporting frame can maintain the upper sash $c$, in the same vertical plane as the lower sash $a$ as shown in Figs. 1 and 2, or with the assistance of the braces $p$ maintain the upper sash at an inclination to its vertical plane as shown in Fig. 3. The length of the bracing sleeves $k$, is less than the length of the upper sections $f$, so that they can be moved on the upper sections clear of the hinge members to permit of the hinge members being bent and the upper sections $f$ folded against the lower sections $j$, as shown in Fig. 4.

To maintain the upper sash $c$ in its adjusted position, stay rods $l$, are connected to the lower sections of the supporting frame, and to some convenient part of the automobile structure, and slidable on the stay rods $l$, are brackets $m$, provided with set screws $o$. Pivoted to the brackets $m$ and to the upper sash $c$, are braces $p$ which by the adjustment of the brackets $m$, rigidly hold the upper sash in any of its adjusted positions as shown in Figs. 2, 3 or 4. The upper sash $c$ is provided with stops $q$ which when the upper sash $c$ is in the position shown in Fig. 1, engage the sides of the lower sash $a$ and prevent the inward movement of the upper sash $c$ beyond the vertical plane of the automobile front. When the upper sash $c$ is positioned as shown in Fig. 1, the brackets $m$, are moved on the stay rods $l$, until the braces $p$, press the stops $q$ tightly into contact with the lower sash and hold them rigidly in contact therewith. When the upper sash is in the position shown in Fig. 3, the brackets $m$ are positioned on the stay rods $l$, so that the latter will hold the upper sash $c$ securely at its inclination to the vertical plane of the automobile front. When the upper sash $c$ is to be positioned as shown in Fig. 4, that is, against the outer surface of the lower sash $a$, the set screws $o$ are released to permit the brackets $m$ to move freely on the stay rods $l$, from the position shown in Fig. 3, to that shown in Fig. 4ª, and finally to the position shown in Fig. 4, as they follow the movement of the braces $p$, and the upper sash $c$ caused by the circular movement of the upper sections $f$ of the supporting frame from the hinge members $h$ as their centers. The lower sash $a$ is provided with locking screws $r$, to engage with the upper sash $c$ and lock it in the position shown in Fig. 4.

Having thus fully described my invention what I claim as new and desire to secure by Letters Patent is:—

1. An automobile front comprising a lower member, an upper member arranged to be moved into the same vertical plane as the lower member, or into a plane at an inclination thereto, so as to present an opening between the top edge of the lower member and the bottom edge of the upper member, foldable means for pivotally supporting, and other means for holding, the upper member in its adjusted position, said last mentioned means consisting of stay rods, brackets slidable on the stay rods, and braces pivotally connected to the brackets and upper member.

2. An automobile front comprising a lower sash, a supporting frame consisting of two lower sections, two upper sections, hinge members connecting the lower sections to the upper sections, and bracing sleeves slidable on the supporting frame inclosing the hinge members and engaging the lower and upper sections to hold them rigidly alined, an upper sash pivotally connected to the supporting frame, and arranged to be moved into the same vertical plane as the lower sash, or into a plane at an angle to the vertical plane, so as to present an opening between the top edge of the lower sash and the bottom edge of the upper sash, stay rods connected to the lower sections of the supporting frame, brackets slidable on the stay rods, and braces pivotally connected to the brackets and to the upper sash.

3. An automobile front comprising a lower sash, a supporting frame consisting of two lower sections, two upper sections, hinge members connecting the lower sections to the upper sections, and bracing sleeves slidable on the supporting frame inclosing the hinge members and engaging the lower and upper sections to hold them rigidly alined, an upper sash pivotally connected to the upper sections of the supporting frame and arranged to be moved into the same vertical plane as the lower sash, or into a plane at an angle to the vertical plane, so as to present an opening between the top edge of the lower sash, and the bottom edge of the upper sash, or into a plane parallel with the vertical plane, stay rods connected to the lower sections of the supporting frame, brackets slidable on the stay rods, braces pivotally connected to the brackets and to the upper sash, and stops connected to the upper sash to engage the lower sash when in the same vertical plane as the latter.

4. An automobile front comprising a lower sash, a supporting frame consisting of two lower sections, two upper sections, hinge members connecting the lower sections to the upper sections, and bracing sleeves slidable on the supporting frame inclosing the hinge members and engaging the lower and upper sections to hold them rigidly alined, an upper sash pivotally connected to the upper sections of the supporting frame and arranged to be moved into the same vertical plane as the lower sash, or into a plane at an angle to the vertical plane, so as to present an opening between the top edge of the lower sash and the bottom edge of the upper sash, or into a plane parallel with the vertical plane, stay rods connected to the lower sections of the supporting frame, brackets slidable on the stay rods, braces pivotally connected to the brackets and to the upper sash, stops connected to the upper sash to engage the lower sash when in the same vertical plane as the latter, and locking means to fasten the upper sash to the lower sash when the former is lowered into a parallel plane against the latter.

Toronto, July 13th, 1907.

ALBERT E. GOODERHAM.

Signed in the presence of—
  S. CRADOCK,
  C. H. RICHES.